United States Patent [19]
Hite et al.

[11] Patent Number: 5,774,170
[45] Date of Patent: Jun. 30, 1998

[54] SYSTEM AND METHOD FOR DELIVERING TARGETED ADVERTISEMENTS TO CONSUMERS

[76] Inventors: Kenneth C. Hite, 3 Center Knolls, Bronxville, N.Y. 10708; Walter S. Ciciora, 45 Hulls Farm Rd., Southport, Conn. 06490-1027; Tom Alison, 280 Barrataria Dr., St. Augustine, Fla. 32086; Robert G. Beauregard, 66 E. Parkway, Apt 1J, Scarsdale, N.Y. 10583

[21] Appl. No.: 354,620

[22] Filed: Dec. 13, 1994

[51] Int. Cl.$^6$ .................................................. H04N 7/10
[52] U.S. Cl. .................................. 348/9; 348/10; 348/12
[58] Field of Search ........................... 348/2, 8, 9, 473, 348/12, 10, 13; 455/5.1, 4.2; H04N 7/10

[56] References Cited

U.S. PATENT DOCUMENTS

| | | |
|---|---|---|
| Re. 33,808 | 1/1992 | Wright, Jr. . |
| 4,331,973 | 5/1982 | Eskin et al. . |
| 4,331,974 | 5/1982 | Cogswell et al. . |
| 4,404,589 | 9/1983 | Wright, Jr. . |
| 4,814,883 | 3/1989 | Perine et al. . |
| 5,155,591 | 10/1992 | Wachob . |
| 5,200,822 | 4/1993 | Bronfin ................................. 348/473 |
| 5,231,494 | 7/1993 | Wachob .................................... 348/8 |
| 5,515,098 | 5/1996 | Carles . |

*Primary Examiner*—Sherrie Hsia
*Attorney, Agent, or Firm*—Ostrolenk, Faber, Gerb & Soffen, LLP

[57] ABSTRACT

This invention enhances television (and radio) advertising by targeting, delivering and displaying electronic advertising messages (commercials) within specified programming in one or more pre-determined households (or on specific display devices) while simultaneously preventing a commercial from being displayed in other households or on other displays for which it is not intended. Commercials can be delivered to specified homes or displays via either over-the-air or wired delivery systems.

67 Claims, 5 Drawing Sheets

SYSTEM AND METHOD FOR DELIVERING TARGETED ADVERTISEMENTS TO CONSUMERS

BACKGROUND OF THE INVENTION

This invention relates to an electronic system and a process for enhancing advertising by delivering TV and radio commercials targeted to individual viewer's based desires and needs.

For over forty years, television (TV) advertising has represented the cornerstone of consumer marketing. The unique combination of sight, sound, and motion offered by TV has allowed marketers to build brand equities by persuading consumers that brand A is either unique and/or better than its competitors.

TV has been dominated by the broadcast networks which were the best available means of broad reach for advertisers. In the 1960's, prior to the advent of cable TV, an advertiser could reach over 90% of U.S. homes in one night via commercials on ABC, CBS, and NBC network TV. Now, however, the world is changing with 67% of U.S. homes wired for cable. Thus, cable systems are effectively replacing on-air broadcast as the actual delivery vehicle for programs.

Broadcast networks and their affiliates however, still receive the vast majority of advertiser dollars for two reasons. First, advertisers believe that placing their commercials in specific programs will ensure that they reach the right kind of viewers (usually based on crude demographic assumptions, e.g., women 18–49 are likely to be the best prospects for their product). Advertisers however are aware that demographic targeting is highly wasteful. For example, dog owners comprise only 30% of households, thus every Ralston-Purina commercial exposure involves 70% waste.

Target marketing is the answer. Deliver your commercial to only those who are the best prospects. Extensive learning from a variety of research suggests the following preferable targets:

* People who already use your product
* Those who use a competitors' brand in your category
* Heavy category users (rule of thumb—the top twenty percent account for 80% or purchases).

Direct mail can now do this, but not TV or radio.

The second reason broadcasters receive the majority of advertising revenue is because they continue to attract the largest audience (approximately 60% of all viewers) despite the proliferation of cable channels which has fragmented the viewing audience. The likelihood that viewers are watching any particular commercial/advertisement is reduced by the sheer quantity of channels. Advertisers have difficulty setting values on the advertising opportunities. The net impact is even more serious than just the waste. The large number of irrelevant commercials contribute to a general lack of attention to those which might normally be of interest.

Advertisers are faced with an even more aggravating situation with the advent of Digital Video Compression (DVC). DVC means that the number of programs which can be carried by any digital media will expand dramatically. There are three parts to the determination of the total capacity of a video transport system: 1) the data rate needed for a program, 2) the amount of data that can be placed in a channel, and 3) the number of channels the system can carry.

It is expected that reasonable quality video will be possible at data rates of three to five million bits of digital information per second. This is stated as 3 Mega bits per second (Mbps). This answers the first issue.

The second issue involves the processing of the signal so that it can be carried in a channel. Current television signals are carried in a spectrum space of six million cycles of electromagnetic energy per second. Cycles per second are given the name Hertz, abbreviated Hz, in honor of the German scientist Heinrich Hertz. Millions of cycles per second are Mega Hertz, abbreviated MHz. There are modulation methods proposed before the Federal Communications Commission (FCC) for advanced television applications which can carry as much as 38.5 Mbps in a 6 MHz channel. This means that as many as twelve "synthetic channels" of 3 Mbps each can be carried in the same spectral "space" as an ordinary 6 MHz television signal. This answers the second issue.

Modern cable systems plan to use ordinary analog signals in the frequency range from 50 MHz up to around 450 MHz. This will allow for 66 ordinary 6 MHz analog video channels which can be used with today's common television receivers and video cassette recorders (VCRs). These same modern cable systems tend to be built with an upper frequency limit of 750 MHz, although a few have gone as high as 1000 MHz. 1000 MHz is a Giga Hertz of frequency, abbreviated as GHz. The difference between the more common 750 MHz upper limit and the 450 MHz top of the analog channels yields 300 MHz of spectrum space. This will carry fifty 6 MHz channels. With each of these channels able to carry twelve or so programs, the total yields about 600 simultaneous programs. A 1.0 GHz system would have ninety one 6 MHz channels capable of carrying around 1100 programs! The growing number of channels and resultant fragmentation of the viewing audience into smaller and smaller units makes it difficult and expensive for advertisers to reach particular consumers.

The same problems also exist in analog video systems, but to a lesser degree. For example, the Time Warner cable system in Queens New York has an analog bandwidth of 1.047 GHz carries 150 analog channels. This number of channels causes problems for those with advertising messages as they attempt to secure the attention of interested viewers.

The operators of delivery systems with large capacity are frustrated by the inability to interest advertisers in any significant amount of participation. It is very difficult to demonstrate the effectiveness of advertising in an environment of a hundred or more channels of advertiser supported programming.

Marketing trials of switched video systems based on Video On Demand, (VOD) have been attempted. These systems implement an interactive home shopping approach which is both very expensive and requires the active participation of the viewer. As such they are not suitable for advertiser support of programming. They are particularly weak in their ability to attract attention to new products and services. For the most part, these kinds of commercials are easily avoided.

Consumers, advertisers, and video delivery system operators would welcome a workable system of advertising subsidy for pay per view (PPV) programming. The current methods subject the viewer to a series of commercials which are mostly of little interest. Because of this, the commercials are annoying. If instead, the commercials were messages matched to the viewers specific and individual interests and needs, they would be both more effective and welcome, particularly if they also contribute to a reduced fee for the viewer.

While a number of such systems and processes are known in this art, none of these systems and processes deal with a way to provide specific commercials to viewers needs and wants in a multichannel environment. For example, Time Warner targets programs and commercials to consumers by employing a geographical node system wherein predetermined advertisements are transmitted to a node such as small town or city neighborhood of contiguous homes for viewing by audiences of 500–4000 connected to the node. This system however does not target individual consumers.

It would be desirable to have a system for targeting commercials to those particular consumers who represent only the best prospects for an advertiser.

SUMMARY OF THE INVENTION

Accordingly, it is an object of this invention to provide a system and process which will solve the problems described above and overcome the disadvantages associated with the prior art systems described above.

It is another object of the present invention to provide viewers with advertisements which are matched to the viewer's interests and needs.

It is another object of the invention to provide such a system and process which will provide advertisers with less waste and greater cost effectiveness in delivering their messages only to those consumers who are desirable prospects.

It is a further object of the invention to provide such a system and process which will allow the operators of video delivery systems to increase the effectiveness of their media in delivering meaningful messages to consumers.

It is another object of the invention to provide a means of dealing with the clutter resulting from hundreds of channels of video and audio programming containing advertising.

The attainment of these and related objectives may be achieved through use of the novel electronic systems and processes herein disclosed.

The process of this invention includes the following steps. The sets of advertisements are prepared so that they are suitable for the transmission and storage means employed. Each commercial is analyzed as to its nature and focus and a Commercial Identifier (CID) code is appended. The messages are then delivered to the point of usage.

Commercials may be classified into three categories: 1) non-preemptable, 2) conditionally preemptable, or 3) unconditionally preemptable. For example, commercials in programs not participating in this system and process would be non-preemptable. Some commercials in programs which are eligible for preemption may also be non-preemptable under some circumstances. These are called conditionally preemptable. An example of such a situation may be that a competitor's product may not be used to preempt. One brand of automobile may be precluded from substituting for another brand of automobile. An unconditionally preemptable commercial may be subject to substitution any time other higher priority commercials are available. In locations not equipped with hardware which implements this system and process, the preemptable commercials are displayed.

Commercials which are subject to preemption are imbedded in programs along with a version of the CID to indicate under what circumstances a more suitable commercial may be substituted.

A suitable process is used to target prospective viewers of a set of advertisements using database search and list selection procedures. The result of this process is a set of appropriate CID codes for the prospective viewers. These CID codes are transmitted to the viewing device and stored.

At the point of usage, a Commercial Processor (CP) is programmed to find and analyze the CID codes in each commercial. When a match between the CID in the commercial and the CID transmitted and stored at the point of use is found, the advertisement is then presented to the viewer. This advertisement can be presented to the viewer either in a single preemptable position in a specific program or during the simultaneous break in programming across all channels received at the point of usage.

When the CIDs do not match, the commercial is ignored and not displayed. There can be either only one match at any given time, or if multiple matches are possible, there is a prioritization sequence that determines which commercial to display and which to ignore. There would always be one default commercial in the batch that would play unless replaced by a higher priority commercial.

Another aspect of the invention is that the system can be further enhanced with additional codes appended to the CID code to provide additional capabilities. Such codes are described as follows and are applicable to all of the following embodiments of the invention:

A frequency indicator code can be appended to the commercial's CID code. The frequency indicator code would be loaded into a register at the display site. The contents of the frequency indicator code register would be decremented each time the commercial is successfully displayed. A successful display of the commercial requires the display device to be in its "on" condition. When the frequency indicator code register reaches zero, the commercial will no longer be displayed.

A context code could be appended to the commercial's CID code. The context code is compared with program identification codes appended to the program signals. The commercial is displayed if it is in a specific channel or network or show. For example, skiing equipment commercials would be shown during a skiing down hill racing competition.

A context blocking code is used to prevent the display of a commercial during certain kinds of programming, For example, a travel commercial would not be used during a drama involving an airplane crash or other travel tragedy.

A sequencing code would be stored at the point of display. It would be used to compute a new CID code for a subsequent commercial. By having a sequential CID code, viewers would see a series of commercials in correct order. One commercial builds on another. Two examples requiring sequencing are tutorials and commercials including a story line which plays out in a determined sequence.

A series of viewer reaction codes can be included to cause additional relevant commercials to be presented in reaction to a viewer's response to questions or other viewer interaction. The relevant commercials could be for more detailed information about the same product or service. Alternatively, they could be for products or services which are likely to be of interest to the viewer based on the viewer's responses. For example, a viewer who requests more information about children's aspirin may also be offered a subsequent commercial on children's chewable vitamins.

A registration code could be added to the CID code and stored at the point of display. When such a commercial is successfully displayed, the registration code is communicated back upstream to the signal origination site. A time and date stamp is added. Two levels of registration are possible. In the simpler level of registration, a count is accumulated at the origination point or some other suitable place indicating the total number of commercials successfully displayed at all locations. Viewer identities are not tabulated. In the second level of registration, a viewer identification number is included in the acknowledgment messages centrally collected.

A certification code could be added to the CID code and stored at the point of display. When such a commercial is successfully displayed, the certification code is communicated back upstream to the signal origination site. A time and date stamp is added. In the case of certification, the viewer responds to the advertisement. This response could be to answer a question, to merely make an acknowledgment, or to request a coupon or other item of value. This indicates that not only has the commercial been successfully displayed, but it has also been viewed, recognized, and acted upon.

There are several options for the upstream transmission of registration or certification codes. This code could be transmitted upstream at the time the commercial was successfully received. Alternatively, the fact that it was received could be stored at the receive site and relayed to the signal origination site upon request or at a pre-programmed more convenient time. Several options for upstream communication exist. These include two-way cable systems, radio transmissions, telephonic communication, or the physical conveyance of a printed report, a magnetic, optical, electronic or other recorded report.

In summary, with the present invention, television (and radio) and advertising are enhanced by targeting, delivering and displaying electronic advertising messages (commercials) within specified programming in one or more pre-determined households (or on specific display devices) while simultaneously preventing a commercial from being displayed in other households or on other displays for which it is not intended. Commercials can be delivered to specified homes or displays via either over-the-air broadcast or wired delivery systems. The preferred embodiments are described below.

In a first preferred embodiment of the system and process in accordance with the invention, an individually addressable digital recording device (RD) with a unique address is installed at the display site in the television or radio receiver, VCR, display device or set-top-box or modular decoder associated with the media provider (cable, DBS, telephone, etc.). One or more commercial identifier codes (CID) are transmitted to and recorded by the RD in advance of the commercial broadcast. As described below, these codes will be used to "tell" the display which upcoming commercials to play and which to ignore.

These data transmissions to the home can be delivered via communications capabilities established with the program delivery system including but not limited to the Vertical Blanking Interval (VBI) of analog video, ancillary subcarriers, amplitude modulation of the frequency modulated audio carrier, totally separate data carriers, or using the digital equivalent of these means of a contracted or affiliated programming service. Later, these identifier codes (CIDs) are attached to or embedded in the beginning of appropriate commercials prior to broadcast or transmission. Alternatively, they can be included or attached elsewhere and include timing information concerning the commercial.

Multiple commercials, each with a unique CID, are simultaneously broadcasted in a television or radio commercial spot. For instance, rather than broadcasting one 30-second commercial, a number of commercials might be broadcasted simultaneously over different separate channels. Note that these simultaneously broadcasted commercials could be compressed in a digital transmission to fit within the distribution bandwidth as necessary. In any event, there would always be one of the number of commercials designated or chosen as a default commercial that would play unless replaced by a targeted commercial. Depending on the capacity of the transmission system, the number of simultaneous commercials could be relatively small—such as four or five (4 or 5)—or much larger.

A Commercial Processor (CP) at the display site would be programmed by an algorithm transmitted to the RD prior to the CID transmission to look for and analyze the CID in each incoming commercial. However, the algorithm may be transmitted along with the transmitted commercials as discussed later in this application. As part of such analyzing in accordance with the algorithm, the CID in each incoming commercial is compared to the CIDs previously received and recorded by the RD. This can be accomplished by having several simultaneous tuners detecting the CIDs in each of the simultaneous commercials. These tuners are installed at the display site in the television receiver, VCR, or set-top box. To assist in the process of comparison, a directory may optionally be provided which maps the locations of the commercials simultaneously available and the commercials which are available for preemption. This would avoid the need for simultaneously operating tuners receiving each of the simultaneous commercials.

If there is a match between the CID in the commercial and the CID in the RD, the commercial is displayed. This is accomplished by tuning to the frequency which contains the targeted commercial and, if it is digitized, selecting the correct digital data stream. When the CIDs do not match, the commercial is ignored and not displayed. In this preferred embodiment, there is one possible match at any given time. However, the system may be designed to employ multiple matches. In such a case, there would be prioritization programming that determines which commercial to display and which to ignore. The system thus described can be enhanced by the additional codes described above.

In summary, in this preferred embodiment of the system and process in accordance with the invention, the commercials are simultaneously transmitted with embedded CID codes. The channels with default preemptable or conditionally preemptable commercials include appropriate CID codes. The CP at the display site compares at least two CID codes in its decision making process. The first is that CID code that is determined as suitable for that display site. This code is stored at the display site. The second CID code is embedded in the commercials available for substitution. The second code may also be embedded in the default commercial. These two codes are compared and if a match is found, the appropriate commercial is displayed. A third CID code may also be transmitted along with the programming in preemptable and conditionally preemptable commercials transmitted. Such a code is provided to ensure that an inappropriate commercial is not displayed for a particular program. The stored CID codes and the third codes are compared. When a permissive match is found, the CP selects the appropriate commercial.

In a second preferred embodiment of the system and process in accordance with the invention, an individually addressable digital recording device (RD) with a unique address is installed at the display site in the television receiver, VCR, display device set-top-box or modular decoder associated with the video provider (cable, DBS, telephone, etc.). CID codes chosen for a particular display site (consumer) are transmitted to and stored in an in-home storage at the display site. Commercials are subsequently transmitted to the in-home storage device with sufficient capacity to hold one or more commercials prior to display. The commercials could be in analog form, but it is more efficient of transmission and storage capacity to digitize and compress the commercials prior to transmission and storage. Attached to each commercial are codes indicating the conditions and rules required to display the commercial, e.g., date, day-part, network, program context, etc. The codes of the commercials transmitted are first compared to the codes previously stored. The commercial transmitted that is found to match is stored in the storage at the display site. Note that the CIDs and display rules would be stored in a storage known as an Ad Queue in the commercial processor.

Commercial time or spots when addressable ads can be displayed will have a unique identifier code (CID). This code will be part of the conditions required for displaying the addressable spot. These eligibility codes could be applied, i.e., transmitted by the network or locally in local-avail spots. The program delivery system would broadcast a default commercial in the spot eligible for the addressable ad. This spot would air in a home or display that was not targeted for an addressable ad in that time period.

The commercial processor in the home would look for the CID in each incoming commercial at a break during a broadcast program. If there was a CID at a break, the processor would apply the display rules for the stored, addressable ads. If there was an ad to display, it would substitute the addressed ad for the default ad, and eliminate it from the ad queue as necessary.

Frequency, sequencing, context, certification and personalization data could be applied as in the first preferred embodiment.

In summary, in the second preferred embodiment, predetermined codes are transmitted to the display site and stored therein, commercials are then sequentially transmitted to the display site prior to the time of their intended use. Appropriate storage is provided at the display site to store one or more of the commercials selected by matching the commercial's CID with that CID determined as appropriate for the display site. The broadcast with a break for a target commercial may then be transmitted with codes in the break. If a match is found and only one commercial is stored, it may be displayed one or more times, depending on whether a frequency code is included. If a registration or certification code is included, that code is returned upstream to the signal origination site when commercials successfully play. The commercial will then be replaced with another. If storage for multiple commercials is provided, they are downloaded and used appropriately.

In a third preferred embodiment of the system and process in accordance with the invention, the commercials are delivered in a switched video on demand (VOD) system. In a VOD system, consumers request programming which can begin at any time. The programming comes from massive storage systems called servers. Those servers supply signals to switches which rout the requested video to the individual display device. The commercial choice switched to that location is based on a match of the CID determined for that location and the CID embedded in the commercial. Such matching may occur at the display site or at the head-end. This approach requires minimal storage at the receive site.

In a fourth preferred embodiment of the system and process in accordance with the invention, the channels with preemptable and conditionally preemptable commercials are synchronized at the signal origination source so that enhanced advertising can be inserted independent of which program is be watched. This makes enhanced advertising particularly valuable. Not only is the commercial selected to fit the needs and wants of the viewer, but these more interesting commercials can be made to appear on a variety of programs. The consumer becomes more reachable even in an environment consisting of hundreds of channels. If the viewer changes channels to another channel with a preemptable commercial, the commercial is uninterrupted even though the channel indicator changes and indicates the new channel. Even if the viewer changes to a channel with non-preemptable commercials, if the new channel is synchronized with the previous channel, the commercial already started could be completed before switching to the new channel. The advertisement is thus "locked up" in the program of the newly selected channel. This embodiment can be combined with any of the previous embodiments.

The appropriate CIDs for each viewer are selected by a marketing organization which accumulates data on viewers to determine the commercials most appropriate to their individual needs and wants. These CIDs are then transmitted individually to each viewing site and stored there for use by the CP. Alternatively, an algorithm can be devised and downloaded to the display site. An inexpensive embedded microprocessor such as a member of the Intel 80386 family, can execute the down loaded algorithm as a conventional microcomputer program. That algorithm is created by the advertisement administrator and/or marketing organization which provides the commercials. The algorithm changes from time to time based on the nature of the commercials and the demographics of the viewers. The algorithm responds to information provided directly or indirectly by the viewer. This is a dynamic process. As the situation of the viewers changes, the CIDs appropriate to those viewers also changes. For example, as children are born, certain products and services are of interest. As the children grow and mature, products and services previously interesting are replaced with those appropriate for older children.

The apparatus at the viewing site can store and process CIDs for multiple individuals at the viewing site. When the viewer identifies himself or herself either directly or indirectly, the commercials appropriate to that individual are presented.

BRIEF DESCRIPTION OF THE DRAWINGS

The attainment of the foregoing and related objects, advantages and features of the invention should be more readily apparent to those skilled in the art, after review of the following more detailed description of the invention, taken together with the drawings, in which.

DETAILED DESCRIPTION OF THE PREFERRED EMBODIMENTS

Figure 1:
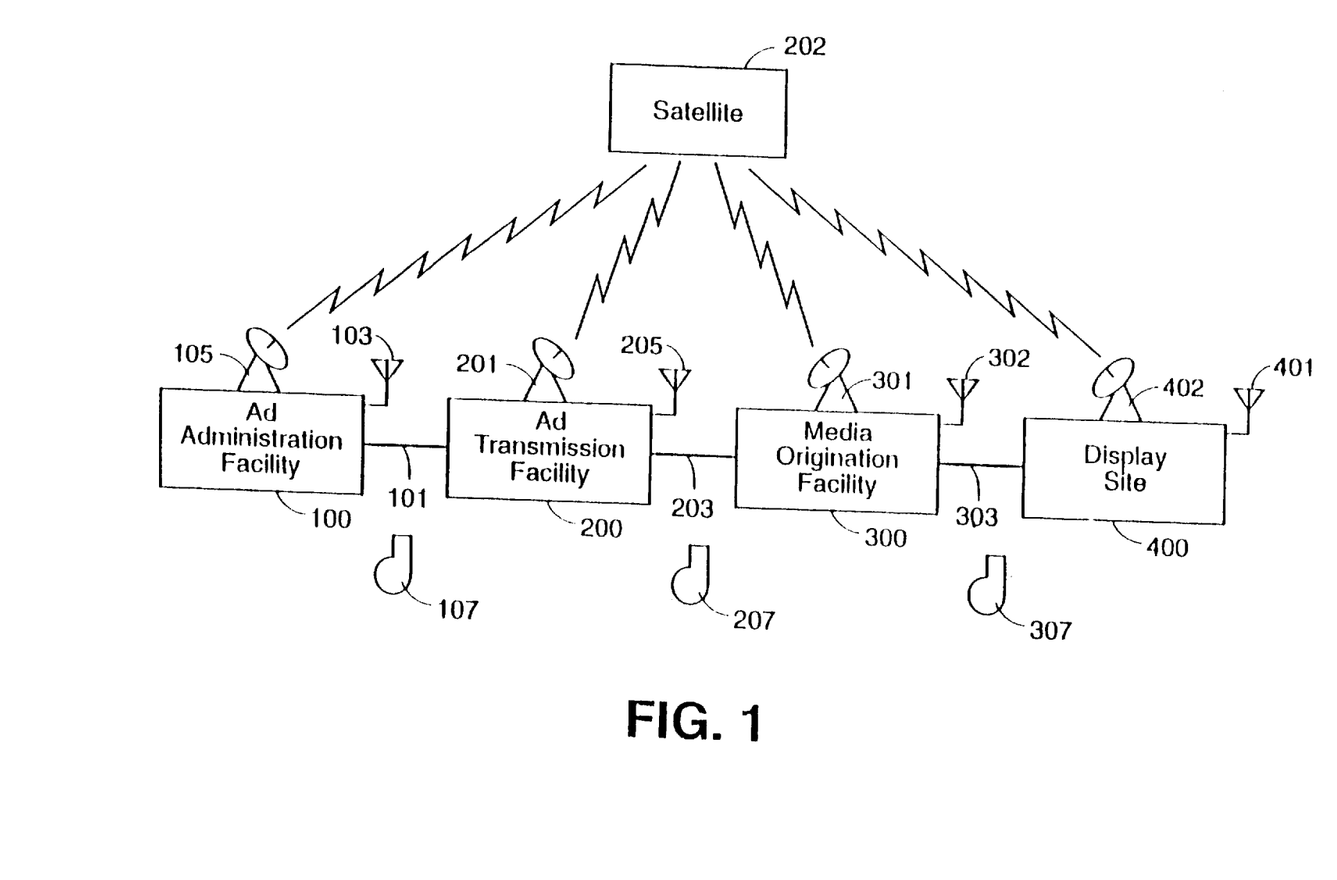
FIG. 1 is a basic block diagram of the system.

Turning now to the drawings, more particularly to FIG. 1, there is shown a block diagram of the overall system. The Ad Administration Facility 100 is where customers, commercials, and programs are analyzed and categorized and the results stored in databases. The information from these databases is used to construct CID codes. Additionally, commercials are received from the agencies that created them and processed as necessary for use in the system. These processed commercials and CID codes are conveyed to the Ad Transmission Facility 200 via an electrical and/or optical link 101. Alternatively, a satellite 202 could be used to convey the processed commercials and CID codes via uplink antenna 105 to antenna 201 which serves as both an uplink and downlink antenna. Land transmission of the processed commercials and CID codes can be accomplished with transmitting antenna 103 and receiving antenna 205. A further alternative is conveyance of the processed commercials and CID codes by physical means such as optical or magnetic tapes or disks or other suitable means, 107.

The Ad Transmission Facility 200 combines the processed commercials and CID codes with other video and/or audio programming and conveys it to a plurality of Media Origination Facilities 300 via satellite 202 using the uplink antenna 201 and the downlink antennas 301. Alternatively, for Media Origination Facilities in close proximity, antenna 205 can be used to transmit some or all of the processed commercials and CID codes to antennas 302 at Media Origination Facilities. An electrical and/or optical link 203 could be used as well as physical conveyance of the processed commercials and CID codes by physical means 207 such as optical or magnetic tapes or disks or other suitable means. The Media Origination Facility 300 also receives programming and commercials from other sources and creates some programming and commercials in its own facilities.

The package of programming and processed commercials and CID codes is conveyed to the display site 400 (reception site) via electrical and/or optical links 303, or radio transmission via antenna 302 and 401, or via satellite 202 and antennas 301 and 402, or even via physical means 307 such as optical or magnetic tapes or disks or other suitable means.

In some situations, one or more of the facilities 100, 200, 300, and 400 may be co-located simplifying the transmission requirements for the processed commercials and CID codes.

Figure 2:
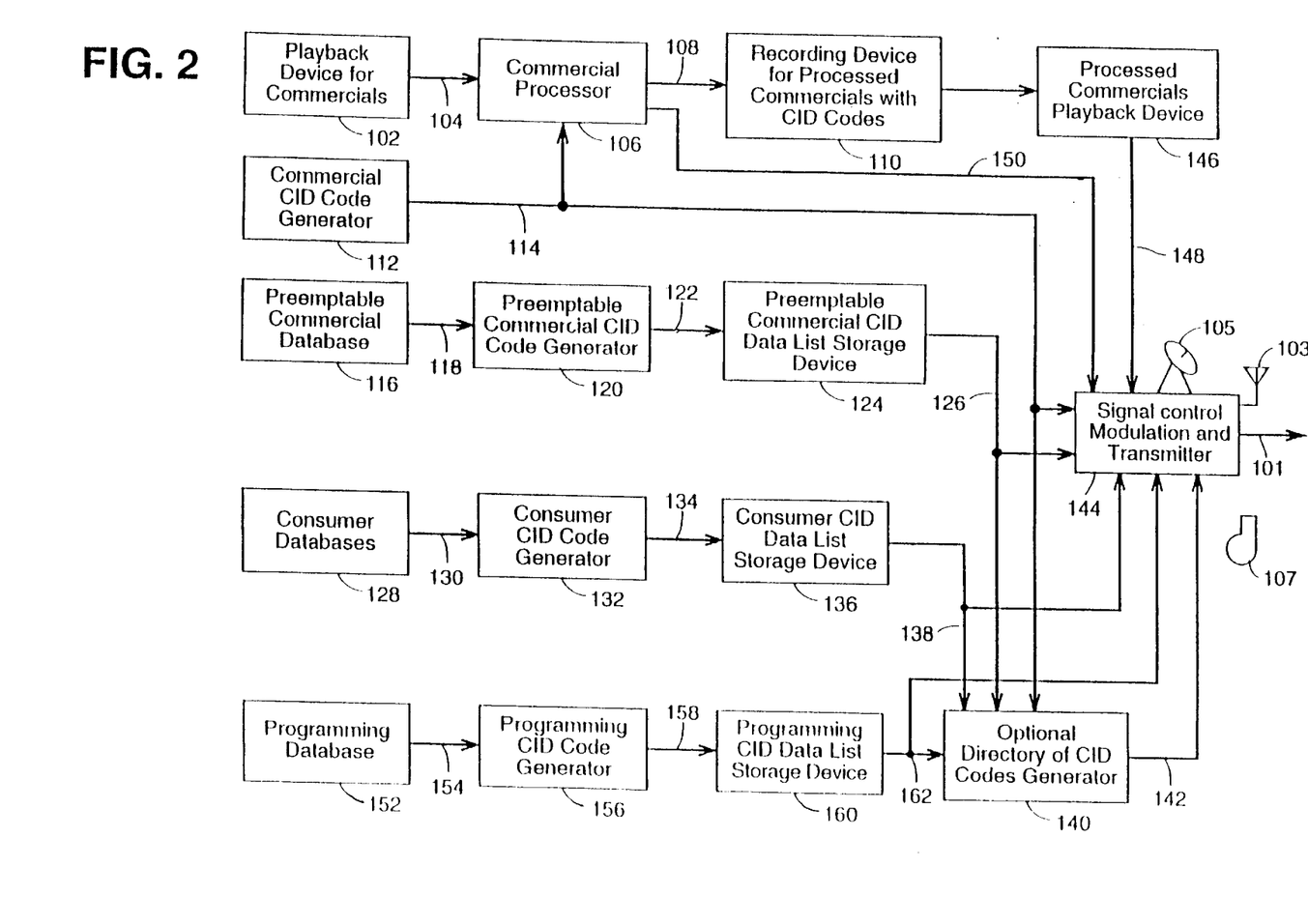
FIG. 2 is a block diagram of the Advertisement Administration Facility.

FIG. 2 is a more detailed block diagram of the Ad Administration Facility 100 of FIG. 1. The Ad Administration Facility is where the characteristics of those viewing or hearing the commercials are analyzed and categorized and the results stored in a Customer Database 128. Commercials suitable to the needs and wants of those viewing or hearing programming are also categorized and an appropriate CID code is generated and appended to the commercial. Information on commercials which can be preempted is stored in a Preemptable Commercial Data Base 116. Programming is also analyzed and categorized to determine the suitability of insertion of different categories of commercials. The results of this analysis is stored in a Programming Database 152. All of these databases yield CID codes which are prepared for conveyance to the Ad Transmission Facility 200.

Commercials are received on a suitable media such as optical or magnetic tape or disks or via satellite and then locally recorded. These commercials are then reproduced via a playback device 102 which conveys the signals via electrical and/or optical connection 104 to a commercial processor 106. The commercial processor 106 prepares the commercial for use in the system and process of this invention. In its simplest form, the commercial processor merely appends the appropriate CID code created in the Commercial CID code Generator 112 and conveyed by electrical and/or optical connection 114. In other applications, the commercial is also converted to digital form. In still other applications the digitized commercial is further processed to reduce signal redundancy and compress it so that it requires less memory to store and less time and capacity to transmit. A number of methods are know to those skilled in the art for accomplishing this. Two examples very well known are the Motion Pictures Experts Group (MPEG) system of compression of video and audio and the DigiCipher method developed and patented by General Instrument Corporation. The processed commercials are conveyed by electrical and/or optical connection 108 to a Recording Device 110 for later playback at a suitable time in the Processed Commercials Playback Device 146. Such recording and playback devices for analog or digital video and/or audio segments are well known in the industry. When played back in the Playback Device 146 the signals are conveyed by electrical and/or optical connection 148 to a Signal Combiner and Modulator and Transmitter 144 which combines it with other signals and prepares it for conveyance to the Ad Transmission Facility 200 of FIG. 1. As previously described, the signal is conveyed by electrical and/or optical connection 101, or by radio transmission using antenna 103, or by satellite transmission using antenna 105, or by physical means 107 such as optical or magnetic tapes or disks or other suitable means. Electrical and/or optical connection 114 also conveys the Commercial CID Code to an Optional Directory of CID Codes Generator 140 which compiles all the CID Codes required for operation of this invention in a summary form and conveys them by electrical and/or optical connection 142 to the Signal Combiner and Modulator and Transmitter 144.

The Preemptable Commercial Database 116 contains lists of commercials which can be preempted with the above described processed commercials. This list is supplied by agencies or organizations which have sold the carriage of the commercial under the condition that it may be preempted under certain circumstances. Data on these commercials is conveyed by electrical and/or optical connection 118 to the Preemptable Commercial CID Code Generator 120 which creates the appropriate CID codes. These CID codes are conveyed by electrical and/or optical connection 122 to the Preemptable Commercial CID Data List Storage Device 124 where they are stored until required. The storage devices used to implement this invention can be of any form which is economical at the time of construction. Examples include magnetic, optical, and semiconductor implemented in tapes, disks, and chips as well as combinations of these technologies. When required, these codes are conveyed by electrical and/or optical connection 126 to the Signal Combiner and Modulator and Transmitter 144 described above and the Optional Director of CID Codes Generator 140 also described above.

The Customer Database 128 contains lists of consumers who would be viewing or listening to programming and would be served by commercials which match their needs and wants based on the systems and process of this invention. This list is supplied by agencies which have gathered data on the consumers and have created algorithms for determining which commercials are most appropriate for those consumers. The combination of the algorithms and the data yield the Consumer CID codes. The specific nature of the data collected and the algorithms varies with the creativity and resources of the advertising agencies using this invention. While examples of the data and algorithms will be supplied, it should be clear to those skilled in these arts that there is a wide variety of combinations of data sets and algorithms which could be used with this invention. Neither the data set nor the algorithm are a part of the invention. Consumer Data is conveyed by electrical and/or optical connection 130 to the Consumer CID Code Generator 132 which creates the appropriate CID codes. These CID codes are conveyed by electrical and/or optical connection 134 to the Customer CID Data List Storage Device where they are stored until required. When required, these codes are conveyed by electrical and/or optical connection 138 to the Signal Combiner and Modulator and Transmitter 144 described above and the Optional Director of CID Codes Generator 140 also described above.

The Programming Database 152 contains lists of programs would be suitable and eligible for use with commercials which match the needs and wants of consumers in the Consumer Database 128. This programming contains Preemptable Commercials as listed in the Preemptable Commercial Database 116. Based on the systems and process of this invention, Processed Commercials will be provided at appropriate times to the Signal Combiner and Modulator and Transmitter 144 in coordination with the data in the Programming Database 152. This list is supplied by agencies or organizations which have gathered data on programming and on the consumers and have created algorithms for determining which commercials are most appropriate for those consumers. The combination of the algorithms and the data yield the Programming CID codes. The specific nature of the data collected and the algorithms varies with the creativity and resources of the advertisers and the Ad Administrator using this invention. While examples of the data and algorithms will be supplied, it should be clear to those skilled in these arts that there is a wide variety of combinations of data sets and algorithms which could be used with this invention. Neither the data set nor the algorithm are a part of the invention. Programming Data is conveyed by electrical and/or optical connection 154 to the Consumer CID Code Generator 156 which creates the appropriate CID codes. These CID codes are conveyed by electrical and/or optical connection 158 to the Programming CID Data List Storage Device 160 where they are stored until required. When required, these codes are conveyed by electrical and/or optical connection 162 to the Signal Combiner and Modulator and Transmitter 144 described above and the Optional Director of CID Codes Generator 140 also described above.

It is possible to directly convey by electrical and/or optical connection 150 the commercials from the Commercial Processor 106 to the Signal Combiner and Modulator and Transmitter 144.

Figure 3:
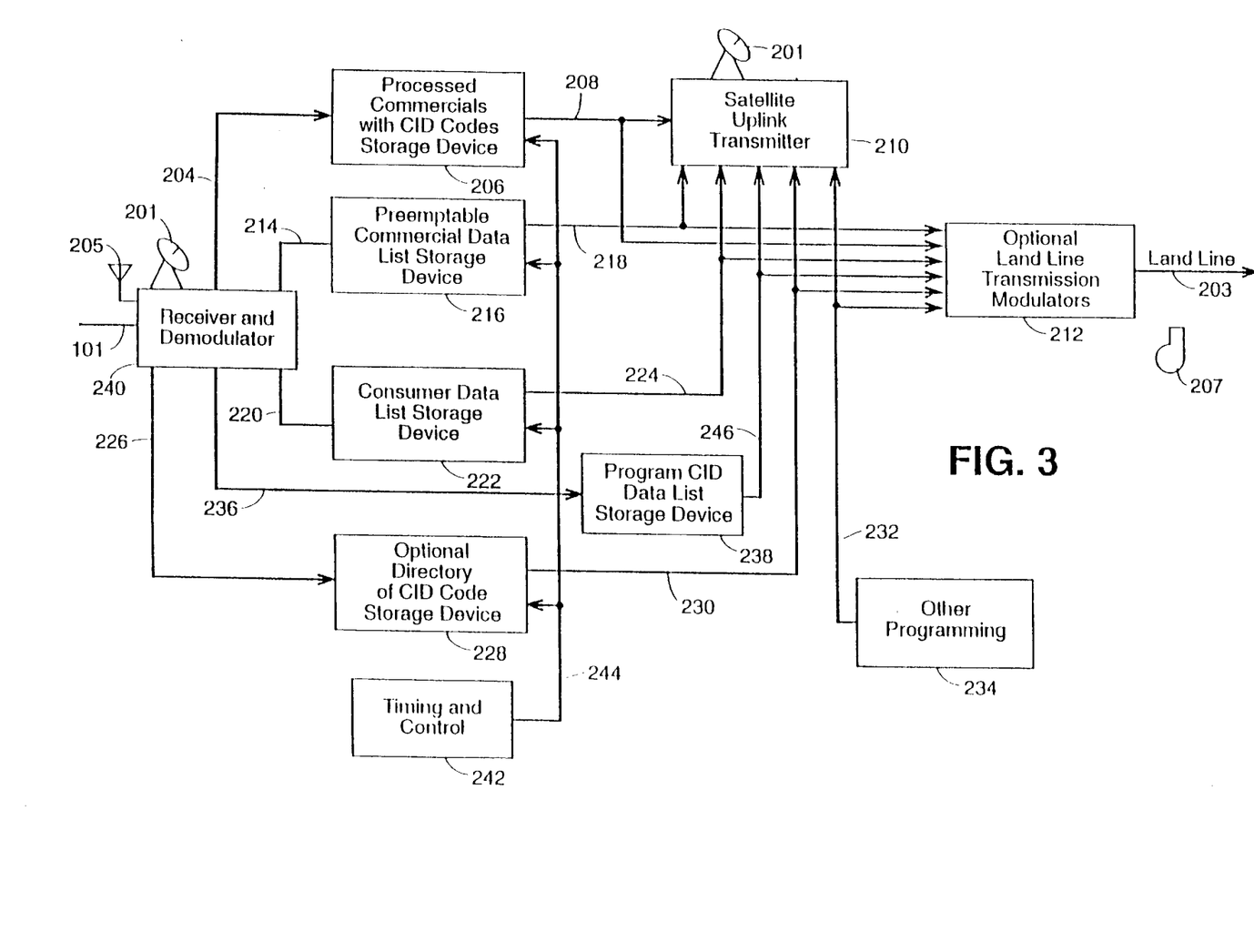
FIG. 3 is a block diagram of the Advertisement Transmission Facility.

FIG. 3 is a more detailed block diagram of the Ad Transmission Facility 200 of FIG. 1 which receives Programming, Commercial, and Consumer information along with appropriate CID codes from the Ad Administration Facility 100 of FIG. 1 via appropriate communications means either via Satellite 202 and Satellite antenna 201 in the receive mode, or via antenna 205, or conveyed by electrical and/or optical connection 101, all previously described. The Receiver and Demodulator 240 disassemble the received signals and deliver the appropriate signal components to the corresponding storage devices. Processed Commercials with CID codes are conveyed by electrical and/or optical connection 204 to the Processed Commercials with CID codes Storage Device 206. The preemptable commercial data list is conveyed by electrical and/or optical connection 214 to the Preemptable Commercial Data List Storage Device 216. The consumer data list is conveyed by electrical and/or optical connection 220 to the Consumer Data List Storage Device 222. The program CID data list is conveyed by electrical and/or optical connection 236 to the Program CID Data List Storage Device 238. The optional directory of CID codes is conveyed by electrical and/or optical connection 226 to the Optional Directory of CID Codes Storage Device 228. The storage devices used to implement this invention can be of any form which is economical at the time of construction. Examples include magnetic, optical, and semiconductor implemented in tapes, disks, and chips as well as combinations of these technologies. These four storage devices are controlled by the Timing and Control element 242 with signals conveyed by electrical and/or optical connection 244. At times which are appropriate for the signals, the Processed Commercial is conveyed by electrical and/or optical connection 208 to the Satellite Uplink Transmitter 210 which feeds satellite antenna 201 in its uplink mode. The same signal is conveyed by electrical and/or optical connection 208 to an Optional Land Line Transmission Modulators element 212 which makes it possible for signals to be conveyed by electrical and/or optical connection 203 to the multiple Media Origination Facilities 300 of FIG. 1. In the same manner, the preemptable commercial data list is conveyed by electrical and/or optical connection 218 from the Preemptable Commercial Data List Storage Device 216 under the influence of the Timing and Control element 242 to the Satellite Uplink Transmitter 210 and Optional Land Line Transmission Modulators 212. In the same manner, the consumer data list is conveyed by electrical and/or optical connection 224 from the Consumer Data List Storage Device 222 under the influence of the Timing and Control element 242 to the Satellite Uplink Transmitter 210 and Optional Land Line Transmission Modulators 212. In the same manner, the program CID data list is conveyed by electrical and/or optical connection 246 from the Program CID Data List Storage Device 238 under the influence of the Timing and Control element 242 to the Satellite Uplink Transmitter 210 and Optional Land Line Transmission Modulators 212. In the same manner, the optional directory of CID codes is conveyed by electrical and/or optical connection 230 from the Optional Directory of CID Codes Storage Device 228 under the influence of the Timing and Control element 242 to the Satellite Uplink Transmitter 210 and Optional Land Line Transmission Modulators 212.

The Ad Transmission Facility is usually a component of a facility which normally transmits a wide variety of other programming on the same transmission means. Other Programming 234 is conveyed by electrical and/or optical connection 232 to the Satellite Uplink Transmitter 210 and Optional Land Line Transmission Modulators 212.

Under some circumstances, all of the signals that would have normally been delivered via satellite or conveyed by electrical and/or optical connection are recorded on some suitable media 207 and physically delivered to the Media Origination Facility 300 of FIG. 1.

Figure 4:
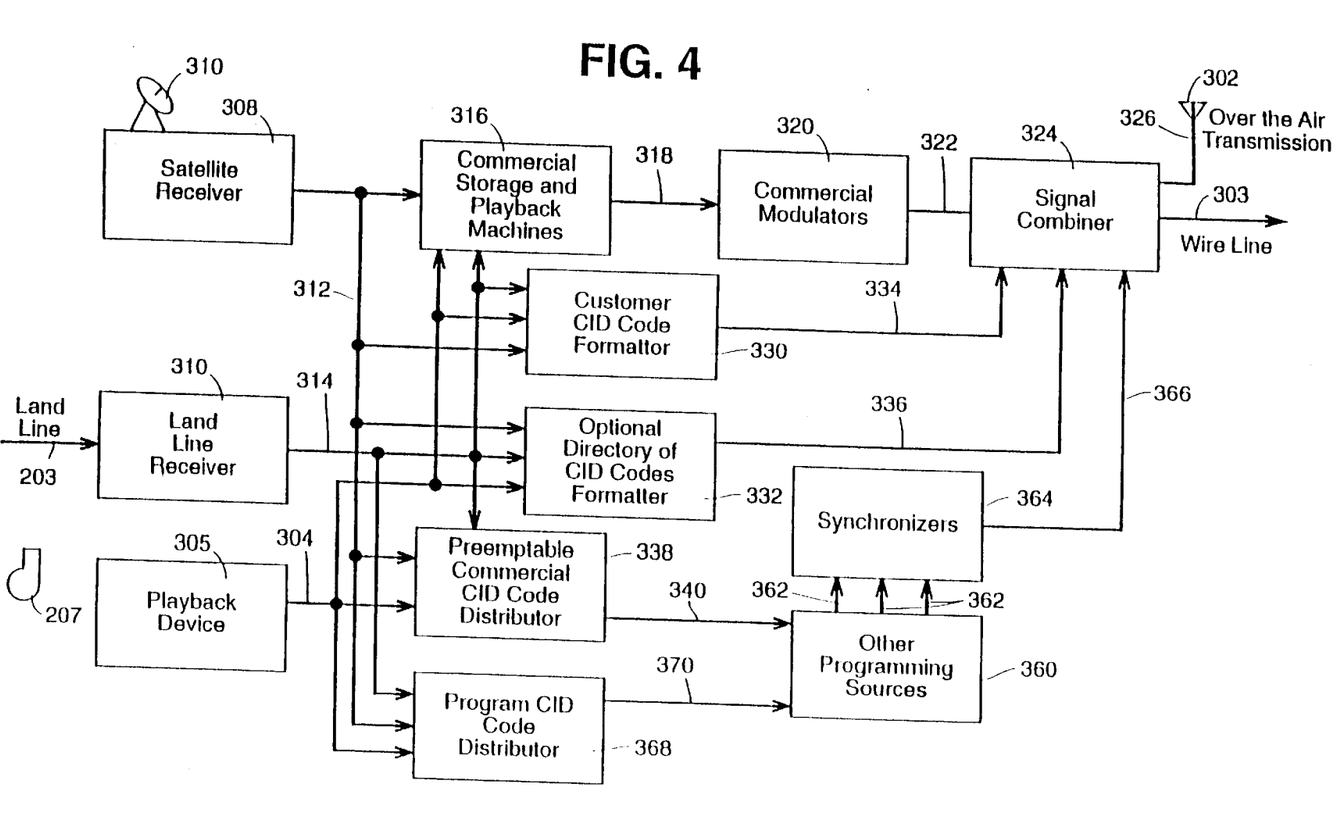
FIG. 4 is a block diagram of the Media Origination Facility.

FIG. 4 is a more detailed block diagram of the Media Origination Facility 300 of FIG. 1. Signals are received from the Ad Transmission Facility 200 of FIG. 1 and from other sources via Satellite 202 to Satellite Antenna 301, conveyed by electrical and/or optical connection 203, and by physical distribution means 207. If the signals arrive via the Satellite Antenna 310, they are tuned and demodulated by Satellite Receiver 308, and conveyed by electrical and/or optical connection 312 to a Commercial Storage and Playback Machine 316, the Customer CID Code Formatter 330, the Optional Directory of CID Codes Formatter 332, the Preemptable Commercial CID Code Distributor 338, and the Program CID Code Distributor 368. If the signals arrive via the electrical and/or optical connection 203, they are tuned and demodulated by Land Line Receiver 310 and conveyed by electrical and/or optical connection 314 to a Commercial Storage and Playback Machine 316, the Customer CID Code Formatter 330, the Optional Directory of CID Codes Formatter 332, the Preemptable Commercial CID Code Distributor 338, and the Program CID Code Distributor 368. If the signals arrive via physical means 207 and the Playback Device 305, they are conveyed by electrical and/or optical connection 304 to a Commercial Storage and Playback Machine 316, the Customer CID Code Formatter 330, the Optional Directory of CID Codes Formatter 332, the Preemptable Commercial CID Code Distributor 338, and the Program CID Code Distributor 368. The output of the Commercial Storage and Playback Machines 316 is conveyed by electrical and/or optical connection 318 to Commercial Modulators 320 which prepare the signal for transmission on assigned frequencies. The Modulated Commercial signals are conveyed by electrical and/or optical connection 322 to a Signal Combiner 324 which conveys the signals by electrical and/or optical connection 326 to an antenna for over the air transmission and or conveys the signals by electrical and/or optical wire line connection 303 to a plurality of Display Sites 400 of FIG. 1. The Signal Combiner 324 is also supplied signals conveyed by electrical and/or optical connection 334 from the Customer CID Code Formatter 330. The Signal Combiner 324 is also supplied signals conveyed by electrical and/or optical connection 336 from the Optional Directory of CID Codes Formatter 332

Other programming is generated locally and is received via satellite, fiber, coaxial cable, twisted pairs, and other means and is represented by the Other Programming block 360. The Program CID Code Distributor 368 conveys CID codes by electrical and/or optical connection 370 for combination with the programming signals. Other Programming 360 signals are conveyed by electrical and/or optical connections 362 to Synchronizers 364. Programming with preemptable commercials is synchronized in the Synchronizer block 364. Programming without preemptable commercials is passed through without any special processing. The synchronized signals with preemptable programming and the other signals which have not been synchronized is conveyed by electrical and/or optical connection 366 to the Signal Combiner 324.

The CID codes inserted in Programming by Program CID Code Distributor 368, in Preemptable Commercials by Preemptable Commercial CID Code Distributor 338, and which come embedded in Commercials played back by Commercial Storage and Playback Machine 316 must be so coded and constructed as to be indistinguishable by ordinary means unless the receive site is authorized to participate. If this was not the case, illegitimate electronic devices could be constructed to "zap" commercials, that is, they would be muted or a recording device such as a VCR would be made to not record them.

Figure 5:
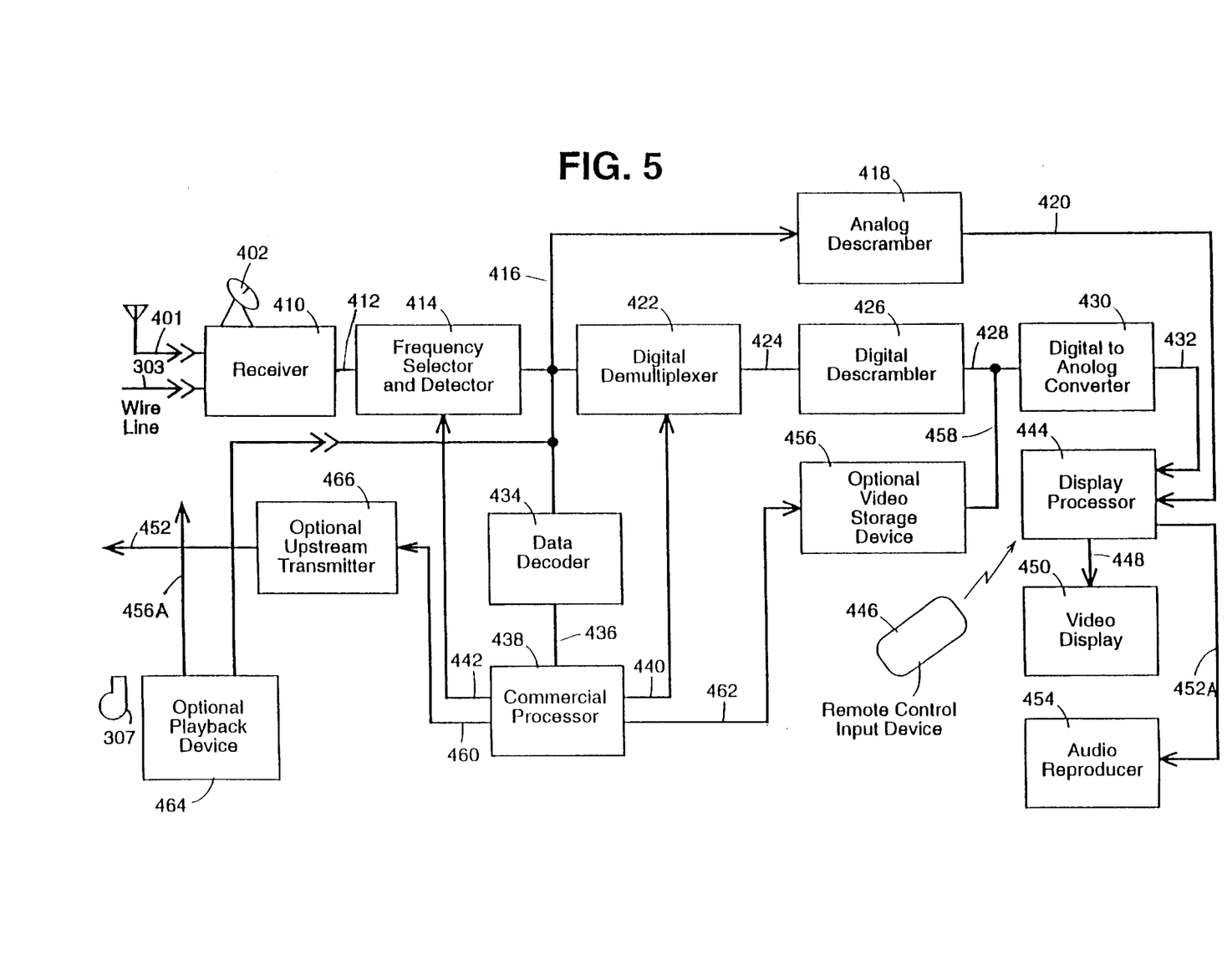
FIG. 5 is a block diagram of the Display Site.

FIG. 5 is a more detailed block diagram of the Display Site of FIG. 1. Signals are conveyed by electrical and/or optical connection 303 and/or by radio via antenna 401 and/or via satellite via satellite antenna 402 to a receiver 410. Optionally, physical media 307 could be used within Optional Playback Device 464 which connects via a radio frequency connection 456A, typically at television channel 3 or 4 to the antenna terminals 404 or cable input 406 of receiver 410. The receiver 410 preprocesses the signal and conveys it by electrical and/or optical connection 412 to a Frequency Selector and Detector 414 which then conveys the selected and demodulated baseband signals by electrical and/or optical connection 416 to a Data Decoder 434 which extracts data required by this invention, and an Analog Descrambler 418 which descrambles analog signals this consumer is authorized to receive, passes unscrambled analog signals, and retains scrambling on analog signals which this consumer is not authorized to receive, and a Digital Demultiplexer 422 which selects one digital signal stream out of the multiplexed combination of digital signals.

The Data Decoder 434 extracts data required by this invention and conveys the extracted data by electrical and/or optical connection 436 to the Commercial Processor 438 which controls the further operation of the system. The Commercial Processor 438 can select the frequencies received by the system by signals conveyed by electrical and/or optical connection 442 to Frequency Selector and Detector 414. The Commercial Processor 438 can select the data stream processed by the digital portions of the system by the system by signals conveyed by electrical and/or optical connection 440 to the Digital Demultiplexer 422. The Commercial Processor 438 can optionally cause upstream signals to be transmitted by signals conveyed by electrical and/or optical connection 460 to the Optional Upstream Transmitter 466 which creates signals conveyed by electrical and/or optical connection 452 to a suitable upstream communications path such as the wire line 303 which may be a coaxial cable, twisted copper pair, or fiber optical link. The Commercial Processor 438 can cause commercial signals to be stored or played back from the Optional Video Storage Device 456 by signals conveyed by electrical and/or optical connection 462 to the Optional Video Storage Device 456.

Digital signals selected from a digital data stream by Digital Demultiplexer 422 under control of the Commercial Processor 438 are conveyed by electrical and/or optical connection 424 to the Digital Descrambler 426. Digital signals which the customer is authorized to receive are descrambled and conveyed by electrical and/or optical connection 428 to a Digital to Analog Converter 430 which converts these signals into a form suitable for further processing and display. Also, the signals from the Digital Descrambler are optionally conveyed by electrical and/or optical connection 458 to an Optional Video Storage Device 456 which can either store or playback certain commercials under the control of signals conveyed by electrical and/or optical connection 462 from the Commercial Processor 438.

Analog signals from the Analog Descrambler 418 are conveyed by electrical and/or optical connection 420 to a Display Processor 444 which combines them with signals from the Digital to Analog Converter 430 conveyed by electrical and/or optical connection 432. Input device 446 emits infra red remote control signals, radio frequency signals, or other suitable signals to the Display Processor 444 which interprets and acts upon their commands. The Display Processor's combined signal is conveyed by electrical and/or optical connection 448 to the video display 450 and is conveyed by electrical and/or optical connection 452A to the Audio Reproducer 454.

The first preferred embodiment of the invention involves supplementary electronics built into set-top boxes, consumer electronics products, personal computers, plug-in modules for the Decoder Interface of "cable ready" products, and other display devices. This electronics has the purpose of managing the display of special advertisements based on the needs and interests of the viewer.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A system for delivery of targeted advertisements to individual consumers each having a display site using code comparison in a control device at the display site, comprising:

(a) the control device at the consumer display site;
   (b) a central storage system for storing a plurality of advertisements; and
   (c) means in the control device for communicating with the central storage system and for selecting an advertisement from the central storage system for delivery to said display site for display intended for a particular consumer based on a command from the control device.

2. The system of claim 1 wherein first information associated with each advertisement is appended to each said advertisement.

3. The system of claim 2 further comprising means for delivering second information associated with the display site to said display site.

4. The system of claim 3 wherein said first information includes at least one first code relating to at least one characteristic of the advertisement to which the first information is appended.

5. The system of claim 4, wherein said second information includes at least one second code relating to a characteristic of said particular consumer.

6. The system of claim 5, wherein said control device comprises means for comparing said at least one first code and said at least one second code and means for presenting said advertisement at said display site when said at least one first code corresponds to said at least one second code.

7. The system of claim 6, wherein said first information further includes at least one third code for indicating the frequency of presentation of said advertisement.

8. The system of claim 6 further comprising means for delivering a program including at least one characteristic code that identifies a characteristic of the program and said first information further includes at least one third code that identifies a characteristic of said advertisement, said system further including means for comparing said at least one third code and said at least one characteristic code and means for presenting said advertisement when said codes match.

9. The system of claim 6, wherein said means for delivering comprises means for delivering a program including at least one code that identifies a characteristic thereof and said first information further includes at least one third code that identifies a characteristic of said advertisement, said system further including means for comparing said at least one third code and said at least one characteristic code and means for preventing said advertisement from being presented when said codes match.

10. The system of claim 6 further comprising means for delivering the plurality of advertisements to said display site and means for sequencing said advertisements intended for the particular consumer.

11. The system of claim 6 further including means responsive to action of a consumer for presenting another advertisement following a first advertisement.

12. The system of claim 6 further comprising means at said display site for registering the time and date of said advertisement displayed.

13. The system of claim 6 further comprising means for certifying that said advertisement has been displayed.

14. The system of claim 1 further comprising means for delivering a plurality of programs to said display site, each program having a break for presenting the advertisement.

15. The system of claim 14 wherein said means for delivering a plurality of programs includes means for synchronizing said breaks of said programs such that said advertisement is presented at the same time during each program.

16. A system for targeting advertisements to consumers each having a display site using code comparison in a control device at the display site, comprising:

(a) the control device at the display site;
   (b) a central storage system for storing a plurality of advertisements, each advertisement having a code associated therewith;
   (c) means for delivering a program and for delivering a selected one of the plurality of advertisements from the central storage system to said display site for display;
   (d) said control device comprising means for communicating with the central storage system and for comparing a code stored in the control device with codes associated with the plurality of advertisements in the central storage system thereby to select the selected advertisement for display at the display site.

17. The system of claim 16 further comprising means for delivering information to said control device at said display site instructing said site to display said selected advertisement while preventing the display of said remaining advertisements.

18. The system of claim 17 wherein said selected advertisement is delivered to said display site subsequent to said information delivery.

19. The system of claim 18 wherein said information includes at least one predefined first code.

20. The system of claim 19 wherein each of said plurality of advertisements have at least one predefined code accompanying each said advertisement.

21. The system of claim 20, wherein said control device comprises means for comparing said at least one predefined first code with said at least one predefined code accompanying said advertisements in the control device.

22. The system of claim 21 wherein said control device comprises means for displaying a selected advertisement when said at least one predefined first code matches said at least one predefined code accompanying said advertisements.

23. The system of claim 17 wherein the control device further comprises means for storing said information.

24. A system for targeting advertisements to consumers using code comparison in a control device at a consumer display site, comprising:

(a) the control device at the display site;
   (b) a central storage system for storing a plurality of advertisements;
   (c) means for delivering a program and for delivering the plurality of advertisements from the central storage system to said display site for display;
   (d) means for allowing the display of a first advertisement and preventing the display of the remaining plurality of advertisements based on a command from the control device; said means for allowing and preventing comprising means for delivering information to said display site instructing said display site to display said first advertisement while preventing the display of said remaining advertisements, said plurality of advertisements being delivered to said display site and being stored in the control device for later display at the display site prior to said information delivery.

25. The system of claim 24 wherein said control device comprises means for storing said advertisements.

26. The system of claim 25 wherein said plurality of advertisements are delivered sequentially.

27. The system of claim 26, wherein said information includes at least one predefined first code.

28. The system of claim 27, wherein said first advertisement and said remaining advertisements each have at least one predefined code accompanying said advertisement.

29. The system of claim 28 wherein said control device comprises means for comparing said at least one predefined first code with said at least one predefined code accompanying each of said advertisements in the control device.

30. The system of claim 29 wherein said control device comprises means for displaying an advertisement if said at least one predefined first code matches said at least one predefined code accompanying said advertisement.

31. The system of claim 5, further comprising means delivered to said display site for determining an appropriate advertisement of said plurality of advertisements to display.

32. The system of claim 31 further comprising means for delivering a program and wherein said program has a plurality of breaks for said advertisements.

33. The system of claim 32 further comprising means delivered to said display site for determining when to search for the advertisements and which breaks are preemptable.

34. The system of claim 5 further comprising means for retrieving an advertisement intended for a consumer viewing said display at a particular time.

35. A system for targeting advertisements to consumers using code comparison in a control device at a consumer display site, comprising:
    first and second display sites each having the control device;
    a central storage system for storing a plurality of advertisements;
    means for delivering a program to said first and second display sites, the program having a plurality of predetermined breaks and means in the control device at each display site for selecting an advertisement from said plurality of advertisements from the central storage system; and
    means comprising the control device at the first display site for selectively displaying a first advertisement at said first site during a first break intended for a first consumer and means comprising the control device at the second display site for simultaneously selectively displaying a second advertisement during said first break different than said first advertisement at said second site intended for a second consumer based on commands from the respective control devices.

36. The system of claim 35 wherein said means for delivering includes means for delivering a code to said first and second display sites prior to said program delivery, corresponding to said first and second consumers respectively.

37. The system of claim 36, wherein said display sites each include means for storing said code in the control device.

38. The system of claim 37 wherein said first and second advertisements each include a code corresponding to a consumer.

39. The system of claim 38, wherein each said control device comprises means for comparing said codes accompanying said advertisements with said code stored in said storing means to determine matching codes.

40. The system of claim 39, wherein each said control device comprises second means for displaying said advertisement at said respective display site when a code accompanying the advertisement matches said stored code and for ignoring an advertisement that does not have a code matching said stored code.

41. The system of claim 40 wherein each said control device comprises means for displaying a default advertisement if the stored code does not match at least one of the codes accompanying the advertisements delivered.

42. The system of claim 41, further comprising means at each control device for displaying said first advertisement if at least one code accompanying each advertisement matches said stored code.

43. A system for targeting advertisements to consumers using code comparison at a display site comprising:
    a control device at the display site, the display site displaying a program having a break for an advertisement;
    a central storage system for storing a plurality of advertisements;
    means for delivering a selected one of the plurality of advertisements from the central storage system to said display site appropriate to a particular consumer; and
    means in the control device for selecting the selected advertisement of said plurality of advertisements in the central storage system for display during said break appropriate for the particular consumer based on a command from the control device at the display site.

44. A system for targeting advertisements to consumers using code comparison at a display site comprising:
    (a) a control device at the display site;
    (b) means for delivering a plurality of advertisements to said control device at the display site for storage at the display site; and
    (c) said control device comprising means for selectively displaying an advertisement of said plurality of advertisements stored at the display site based on commands stored in the control device.

45. The system of claim 44 further comprising means for ensuring that said advertisement is displayed at said display site at a predetermined time regardless of a program being viewed.

46. A method for targeting advertisements to respective consumers using code comparison at each consumer's viewing site comprising the steps of:
    selecting an advertisement from a central storage system based on a command from a control device at the viewing site; and
    delivering the selected advertisement for display to the viewing site intended for a particular consumer.

47. The method of claim 46, further comprising the step of assigning at least one first code to each said advertisement according to a predetermined characteristic of each said advertisement.

48. The method of claim 47 further comprising the step of assigning at least one second code to said viewing site.

49. The method of claim 48, further comprising the step of comparing said at least one first code and said at least one second code and presenting said advertisement at said viewing site when said at least one first code corresponds to said at least one second code.

50. A method for targeting advertisements to consumers based on commands from a consumer display site comprising the steps of:

delivering a program and a plurality of advertisements to the consumer display site;

storing the advertisements at the display site for later display in the program at the display site; and selectively allowing the display of a first advertisement at said display site and preventing the display of the remaining plurality of advertisements based on a command from the display site.

51. A system for delivery of targeted advertisements to individual consumers at respective display sites based on commands from the display sites comprising:

a control device at each consumer display site;

means responsive to a consumer action for delivering a program to the consumer display site, said program having at least one break for an advertisement; and means in the control device for selecting a predetermined advertisement in a central storage system for delivery to said display site for display during said break intended for a particular consumer based on a command from the control device at the display site.

52. The system of claim 51 further comprises means for delivering an advertisement that includes information that has been matched with information determined for said display site.

53. The system of claim 1 wherein means are provided for monitoring the execution of the advertisement.

54. The system of claim 1, wherein means are provided for sequencing the display of advertisements so that the advertisements play in a prescribed order.

55. The system of claim 1, wherein means are provided for displaying the advertisement a prescribed number of times.

56. The system of claim 1 wherein means are provided for coupling the advertisement to related advertisements.

57. The system of claim 1 wherein means are provided for certification of the advertisement.

58. The system of claim 24, wherein means are provided for monitoring the execution of at least one of the advertisements.

59. The system of claim 24, wherein means are provided for sequencing the display of advertisements so that the advertisements play in a prescribed order.

60. The system of claim 24 wherein means are provided for displaying an advertisement a prescribed number of times.

61. The system of claim 24, wherein means are provided for coupling at least one of the advertisements to related advertisements.

62. The system of claim 24, wherein means are provided for certification of at least one of the advertisements.

63. A system for targeting advertisements for display at a consumer display site, comprising:

a control device at the consumer display site, the control device receiving a program and a plurality of advertisements for display at the display site;

the control device having a storage device for storing the plurality of advertisements;

the control device allowing the display of a selected advertisement of the plurality of advertisements; said control device including a comparator for comparing a code appended to each advertisement and a code stored in the control device and for displaying an advertisement in a break in the program when the codes match.

64. The system of claim 63 further comprising means for delivering a code for storing in the control device related to a consumer at the display site.

65. The system of claim 64 wherein the plurality of advertisements are stored in the control device at the display site prior to delivery of the code.

66. The system of claim 64, wherein the plurality of advertisements are stored in the control device at the display site subsequent to delivery of the code.

67. A system for targeting advertisements for display at a consumer display site, comprising:

a control device coupled to the display device at the display site, the control device controlling the display of a program having a break for an advertisement on the display device;

the control device having a selector for selecting an advertisement from a plurality of advertisements stored in a central storage system based on a comparison of a code stored in the control device and a code appended to each of the advertisements; and the control device receiving the selected one of the plurality of advertisements from the central storage system for display on the display device.

* * * * *